UNITED STATES PATENT OFFICE 2,593,009

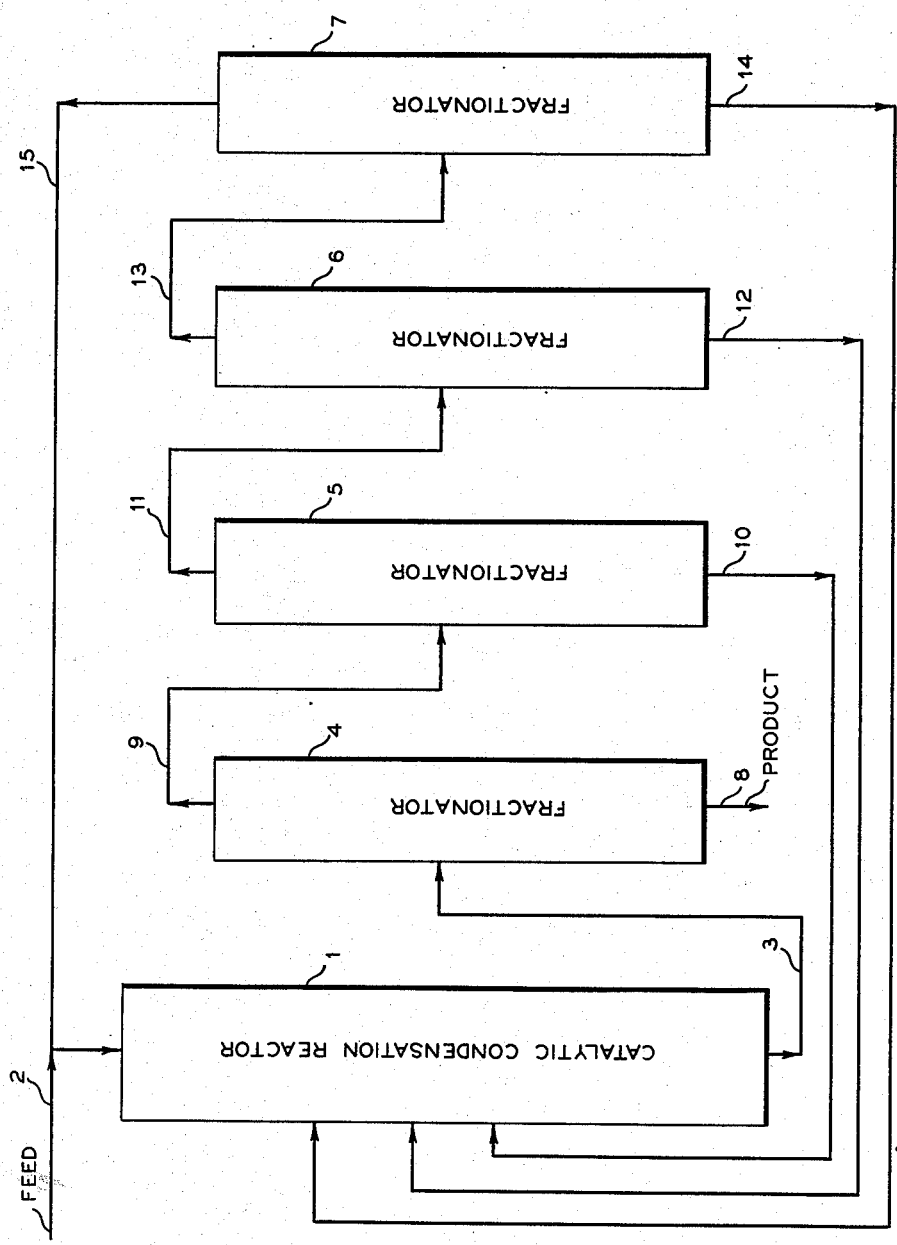

CONDENSING LOWER ALCOHOLS TO HIGHER ALCOHOLS

Alfred Clark and Francis E. Condon, Bartlesville, Okla., assignors to Phillips Petroleum Company, a corporation of Delaware Application October 31, 1949, Serial No. 124,664

1 Claim. (Cl. 260—642)

This invention relates to the condensation of alcohols. In one of its aspects the invention relates to the condensation of an alcohol to produce essentially one desired condensation product. In another of its aspects this invention relates to a method or combination of steps with which essentially only a desired alcohol condensation product can be obtained.

The condensation of alcohols is known. Alcohols such as ethanol, n-propanol, isopropanol, n-butanol and isobutanol, etc., have been condensed to produce alcohols of higher molecular weight than that of the starting materials. The reaction which proceeds with elimination of water of condensation, has been effected at an elevated temperature and an elevated pressure employing an alkaline catalyst, for example, sodium hydroxide, potassium hydroxide or other alkali metal hydroxide or oxide, or an alkali metal or alkaline earth alkoxides, or even an organic acid salt of an alkali or alkaline earth metal. Also suitable is a copper-chromium oxide catalyst as described and claimed in application Serial No. 133,037, filed December 15, 1949, by Edward E. Burgoyne.

The temperature has usually been maintained in the approximate range 400°–700° F., preferably in the approximate range 550°–600° F.

The pressure has usually been maintained at a value in the range of from atmospheric to about 3,000 pounds per square inch gage, preferably in the approximate range of 1,500–2,700 pounds per square inch gage.

Contact times have ranged from about 5 to about 120 minutes, preferably 15–60 minutes.

It has now been found that an alcohol condensation product which is essentially a desired end condensation product can be produced by initiating an alcohol condensation reaction to produce a desired end condensation product, continuing said reaction to form said end condensation product, separating into its components the effluent from said reaction, and returning uncondensed and insufficiently condensed alcohols to the condensation zone for a further residence time therein which is inversely proportional to the extent to which the returned alcohols have been previously condensed.

Among the objects of this invention is the provision of a process for the condensation of an alcohol.

Further among the objects of the present invention is the provision of a process for the gradual condensation of an alcohol in such a manner that overcondensation of any of the alcohol is substantially completely avoided.

Also among the objects of the invention is the provision of a process for the condensation of an alcohol to obtain a final product which is essentially one desired end condensation product.

Still among the objects of the present invention is the provision of a series of process steps in a combination such that the continuous condensation of at least one alcohol can be effected to a product which is essentially one desired end condensation product.

Other objects as well as advantages of the invention are evident from this disclosure, the drawing and the claims.

According to this invention there is provided a process for the condensation of an alcohol which comprises, in combination, the steps of initiating and continuing a condensation of an alcohol in a condensing zone under condensing conditions; passing alcohol, which has been condensed to a desired extent, partially condensed alcohol and uncondensed alcohol to an alcohol fractionation or other alcohol separating zone; in said separating zone separating said alcohol which has been condensed to a desired extent from the remaining alcohols as a product of the process; further separating in said zone uncondensed alcohol from the remaining alcohols; recycling said uncondensed alcohol to said condensing zone; and returning the then remaining partially condensed alcohol to said condensing zone in a manner and to a locus such that its residence time therein is inversely proportional to the extent to which it has been condensed previously. When the partially condensed alcohol portion contains alcohols in several stages of condensation, the separating zone is so arranged and operated that the said portion is separated into said alcohols in respect of their extent of condensation and then each of the separated alcohols is returned to said condensing zone in a manner and to a locus such that its residence time therein is inversely proportional to the extent to which it has been condensed previously.

The drawing illustrates diagrammatically an embodiment of the invention.

A charge of catalyst, having been placed into condensing vessel 1, and heated to a suitable temperature and maintained therein at said temperature under a suitable pressure, the alcohol, or alcohols, to be condensed are introduced through line 2. The conditions are preferably so selected as to avoid overcondensation. Thus, the reacted alcohols when removed from vessel 2, through line 3 will contain alcohol condensed to a desired extent as well as alcohol condensed to different extents and even uncondensed alcohol. Therefore, the reacted alcohols are passed through line 3 into a fractionation zone, in this case, consisting of four fractionators 4, 5, 6 and 7. As realized by one skilled in the art the highest boiling, or desirably condensed alcohol will be withdrawn as product through line 8 while less condensed alcohol will be passed to fractionator 5 through line 9. In fractionator 5 the alcohols are further fractionated to yield through line 10, the alcohol in highest state of condensation of those entering said fractionator 5. This alcohol is passed via line 10 to the condensing zone in a manner and at a locus such that its residence time therein will be sufficient to condense it to a desired extent without, however, causing its overcondensation. The overhead from fractionator 5 is passed through line 11 into fractionator 6 from the bottom of which a still less condensed alcohol is returned, via line 12 to the condensing zone in a manner and at a locus such that its residence time therein will cause its further condensation to a desired extent but avoiding, however, its overcondensation. Overhead from fractionator 6 is passed through line 13 to fractionator 7 from which a still less condensed alcohol is returned, like those in lines 10 and 12, to the condensing zone in a similar manner. Uncondensed alcohol is recycled to the condensing zone via line 15.

It is within the scope of the invention to alter the nature of any of the streams being fed to the process.

Thus, the alcohols which can be employed are those which have been condensed or are capable of being condensed. Also, it is possible to feed various mixtures of alcohols, even together with diluents, or other materials, into the condensing zone.

The streams in lines 8, 10, 12, 14 and 15 can be altered by dilution, cooling or even preheating to cause these to coact with conditions prevailing in the condensing zone to therein accomplish the results which are desired.

The temperatures and pressures which are suitable in any given case can be readily determined by mere routine test but will, usually, however, be comprised within those set out in this disclosure. Also, while not limited thereto, the catalysts set out herein are now preferred to be employed in the process.

Any entrained or dissolved catalyst can be recovered and recycled by any of the known prior art methods of catalyst recovery.

It is to be noted, especially, that the above-described invention provides a process which neatly accomplishes a desired extent of condensation without, however, causing overcondensation and that it is equally adapted to the stagewise condensation of an alcohol or a mixture of alcohols or alcohol with some other material or substance.

The following examples serve to illustrate further the process of the invention.

*Example I*

Isobutyl alcohol (144.6 g.) and isopropyl alcohol (245.0 g.) and potassium hydroxide (32.6 g.) were sealed in a one-liter steel autoclave and were heated at about 570° F. for several hours. The pressure was 2450–2750 p. s. i. and there was a residual pressure of 810 p. s. i. after the autoclave had cooled to room temperature. The liquid contents of the autoclave were washed with brine and were dried with Drierite. The dried material (251.4 g.) was distilled in a 60 inch glass fractionating column, 0.5 inch in diameter, packed with glass helices and gave the following fractions:

| Fraction | Boiling Range, °F. | Wt. g. | Identity |
| --- | --- | --- | --- |
| 1 | 142–219 | 83.9 | Isopropyl Alcohol. |
| 2 | 219–289 | 8.4 | Isobutyl Alcohol. |
| 3 | 289–349 | 19.1 | |
| 4 | 249+ | 103.3 | Residue. |
| | | 36.7 | Holdup and Loss. |

Fraction 3 boiled mostly in the range 302–306° F. and was identified as 5-methyl-2-hexanol. Approximately 70% of the residue boiled at 145–181° F. at 1 mm. It has been shown to be an eleven carbon alcohol.

*Example II*

A mixture of 66.6% (mol) isobutyl alcohol and 33.3% isopropyl alcohol along with a recycle stream which will be described subsequently is fed into a vertical reactor packed with an alkaline catalyst. Reaction occurs producing chiefly 5-methyl-2-hexanol and a $C_{11}$ alcohol. The $C_{11}$ alcohol is separated by fractionation from unconverted charge and $C_7$ alcohol. The $C_7$ alcohol is separated in a second fractionation step from unconverted isobutyl alcohol. The isopropyl alcohol is essentially completely reacted in one pass. The isobutyl alcohol is recycled to the top of the reactor and the $C_7$ alcohol is introduced below the mid-point of the reactor. The combined inlet stream to the top of the reactor will consist approximately of 2½ mols of isobutyl alcohol per mol of isopropyl alcohol. Approximately ½ mol of $C_7$ is recycled per mol of fresh isopropyl alcohol and approximately 1 mol of $C_{11}$ or higher is produced per mol of isopropyl alcohol introduced to the system. The reactor is run at about 600° F. and 1500–2000 p. s. i. g. The throughput is approximately 1 volume of total liquid charge per volume of catalyst per hour.

Reasonable variation and modification are possible within the scope of the foregoing disclosure and the appended claims to the invention the essence of which is that an alcohol can be desirably condensed in high yield while avoiding overcondensation thereof, as described.

We claim:

A process for the chemical condensation of a condensible alcohol to an alcohol of a desired number of carbon atoms which comprises in combination the steps of initiating and continuing a condensation of an alcohol in a condensing zone under condensing conditions for a time period sufficient to cause condensation of a portion of said alcohol to said alcohol of said desired number of carbon atoms; passing alcohol, which has been condensed to said desired condensed alcohol of said desired number of carbon atoms, partially condensed alcohol having a lesser number of carbon atoms than said desired alcohol and any uncondensed alcohol to an alcohol separating zone; in said separating zone separating said alcohol having said desired number of carbon atoms from the remaining alcohols as a product of the process; further separating in said separating zone uncondensed alcohol from the now remaining alcohols; recycling said uncondensed alcohol to said condensing zone for treatment as before; separately returning the then remaining partially condensed alcohol of said lesser number of carbon atoms to said condensing zone and therein resubmitting it to said condensing conditions for a time period which is of shorter duration than the time period that the uncondensed alcohol remained in said condensing zone to form said alcohol having said desired number of carbon atoms, the said time period of shorter duration being inversely proportional to the extent to which said alcohol of a lesser number of carbon atoms has been condensed.

ALFRED CLARK.
FRANCIS E. CONDON.

REFERENCES CITED

The following references are of record in the file of this patent:

UNITED STATES PATENTS

| Number | Name | Date |
|---|---|---|
| 2,457,866 | Carter | Jan. 4, 1949 |